United States Patent
Gupta et al.

(10) Patent No.: US 10,598,270 B2
(45) Date of Patent: Mar. 24, 2020

(54) LUBRICATION SYSTEM FOR RACK AND PINION MAST

(71) Applicant: Nabors Drilling Technologies USA, Inc., Houston, TX (US)

(72) Inventors: Ashish Gupta, Houston, TX (US); Padira Reddy, Richmond, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 269 days.

(21) Appl. No.: 15/603,954

(22) Filed: May 24, 2017

(65) Prior Publication Data

US 2017/0343097 A1    Nov. 30, 2017

Related U.S. Application Data

(60) Provisional application No. 62/341,117, filed on May 25, 2016.

(51) Int. Cl.
*F16H 57/04* (2010.01)
*F16H 19/04* (2006.01)

(52) U.S. Cl.
CPC ......... *F16H 57/0431* (2013.01); *F16H 19/04* (2013.01); *F16H 57/043* (2013.01); *F16H 57/045* (2013.01); *F16H 57/0426* (2013.01); *F16H 57/0436* (2013.01); *F16H 57/0441* (2013.01)

(58) Field of Classification Search
CPC .............................. F16H 57/0431; F16H 19/04
See application file for complete search history.

(56) References Cited

U.S. PATENT DOCUMENTS

| 3,424,022 | A | * | 1/1969 | Greenberg | .......... F16H 57/0431 74/409 |
| 3,716,158 | A | * | 2/1973 | Hansen | .................... B66F 9/149 414/666 |
| 5,094,039 | A | * | 3/1992 | Yoshioka | ................ B23F 21/03 451/450 |
| 5,622,239 | A | * | 4/1997 | Orlitzky | .............. F16H 57/0463 184/39 |
| 8,308,177 | B2 | * | 11/2012 | Fravel | ....................... B60R 9/02 187/216 |
| 9,469,507 | B2 | * | 10/2016 | Awerbuch | ................. B66B 9/08 |
| 2006/0204360 | A1 | * | 9/2006 | Hinz | ..................... F03D 7/0224 415/175 |
| 2007/0081896 | A1 | * | 4/2007 | Mollhagen | .............. F03D 80/70 416/98 |

(Continued)

FOREIGN PATENT DOCUMENTS

DE    202014004715    *    6/2014

*Primary Examiner* — Michael A Riegelman
(74) *Attorney, Agent, or Firm* — Adolph Locklar

(57) ABSTRACT

A lubrication system for a rack and pinion mast of a drilling rig includes a lubricating pinion positioned on a cart and in engagement with the rack. The lubricating pinion includes a plurality of lubrication dispensing ports formed on faces of the teeth of the pinion. The lubrication dispensing ports are fluidly coupled to lubrication ports formed in the lubricating pinion. The lubrication ports fluidly couple to an inner bore of the lubricating pinion. The inner bore may be fluidly coupled to a lubricant reservoir.

8 Claims, 5 Drawing Sheets

(56) References Cited

U.S. PATENT DOCUMENTS

| | | | | |
|---|---|---|---|---|
| 2007/0293365 A1* | 12/2007 | Thoma | ............... | F16H 57/0431 |
| | | | | 475/331 |
| 2008/0268997 A1* | 10/2008 | Gooden | ............. | F16H 57/0431 |
| | | | | 475/160 |
| 2008/0276743 A1* | 11/2008 | Salmela | ............. | F16H 57/0431 |
| | | | | 74/467 |
| 2009/0139799 A1* | 6/2009 | Tiwari | ............... | F16H 57/0431 |
| | | | | 184/6.12 |
| 2009/0143178 A1* | 6/2009 | Sakura | .................. | F16H 55/30 |
| | | | | 474/152 |
| 2010/0000358 A1* | 1/2010 | Paluncic | ................ | F04C 2/084 |
| | | | | 74/468 |
| 2013/0192930 A1* | 8/2013 | Segovia | ............. | F16H 57/0431 |
| | | | | 184/14 |
| 2013/0233105 A1* | 9/2013 | Chen | ...................... | F16H 57/12 |
| | | | | 74/421 R |
| 2014/0124293 A1* | 5/2014 | Eversole | .................. | B66F 3/02 |
| | | | | 182/103 |
| 2014/0231176 A1* | 8/2014 | Zanichelli | ................ | B66F 9/08 |
| | | | | 187/226 |
| 2014/0286775 A1* | 9/2014 | Pasquet | ............. | F16H 57/0431 |
| | | | | 416/155 |
| 2015/0101826 A1* | 4/2015 | Gupta | ................. | E21B 19/164 |
| | | | | 166/377 |
| 2015/0114756 A1* | 4/2015 | Xu | ..................... | F16H 57/0431 |
| | | | | 184/4 |
| 2017/0082189 A1* | 3/2017 | Paal | ...................... | F16H 57/043 |
| 2017/0343097 A1* | 11/2017 | Gupta | ............... | F16H 57/0431 |

\* cited by examiner

LUBRICATION SYSTEM FOR RACK AND PINION MAST

CROSS-REFERENCE TO RELATED APPLICATIONS

This application is a nonprovisional application that claims priority from U.S. provisional application No. 62/341,117, filed May 25, 2016.

TECHNICAL FIELD/FIELD OF THE DISCLOSURE

The present disclosure relates in general to drilling rigs, and in particular to a drilling rig employing a carriage movable along racks.

BACKGROUND OF THE DISCLOSURE

Drilling rigs typically include one or more hoisting apparatuses. In some drilling rigs, the hoisting apparatus may be a carriage movable along a vertical mast. The carriage may include one or more motors which turn pinions in engagement with racks positioned on the mast to move the carriage vertically.

SUMMARY

An embodiment of the present disclosure is directed to a lubrication system for a carriage movable along a mast having a rack. The lubrication system includes a lubricating pinion, the lubricating pinion mechanically coupled to the carriage and in engagement with the rack. The lubricating pinion includes a lubricant dispensing port. The lubricant dispensing port is formed on a face of a tooth of the lubricating pinion. The lubrication system also includes a lubricant reservoir and a pump to pump lubricant from the lubricant reservoir to the lubricant dispensing port.

Another embodiment of the present disclosure is directed to a method. The method includes providing a mast, the mast having a rack. The method also includes mechanically coupling a carriage to the mast such that the carriage is movable relative to the mast. The carriage includes a lubrication system. The lubrication system includes a lubricating pinion, the lubricating pinion mechanically coupled to the carriage and in engagement with the rack. The lubricating pinion includes a lubricant dispensing port, the lubricant dispensing port formed on a face of a tooth of the lubricating pinion. The lubrication system also includes a lubricant reservoir and a pump to pump lubricant from the lubricant reservoir to the lubricant dispensing port. The method includes pumping lubricant from the lubricant reservoir to the lubricating pinion and dispensing lubricant from the lubricant dispensing port.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
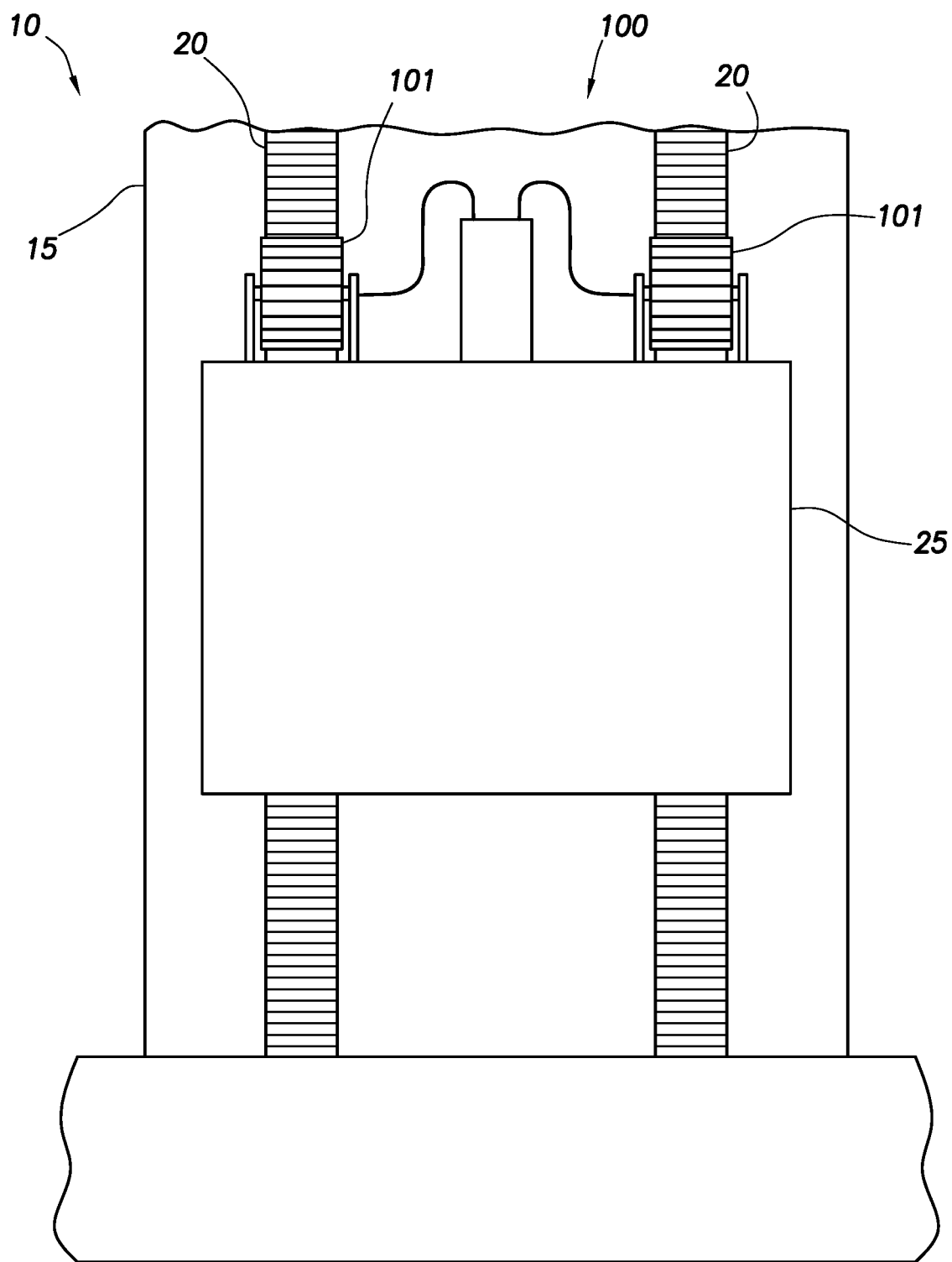
FIG. 1 depicts a lubrication system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As depicted in FIG. 1, drilling rig 10 may include mast 15. Mast 15 may include racks 20 mechanically coupled thereto. Carriage 25 may include one or more drive pinions that engage with racks 20. The drive pinions may be powered by one or more motors including, for example and without limitation, electric or hydraulic motors. Rotation of the drive pistons may cause carriage 25 to move vertically along mast 15. Carriage 25 may be mechanically coupled to mast 15 in any suitable way known in the art without deviating from the scope of this disclosure.

In some embodiments, carriage 25 may include lubrication system 100. Lubrication system 100 may include one or more lubricating pinions 101. Lubricating pinions 101 engaged with racks 20 such that lubricating pinions 101 rotate as carriage 25 moves vertically along mast 15. Lubricating pinions 101 may, as discussed further herein below, dispense grease or other lubricant onto racks 20.

Figure 2:
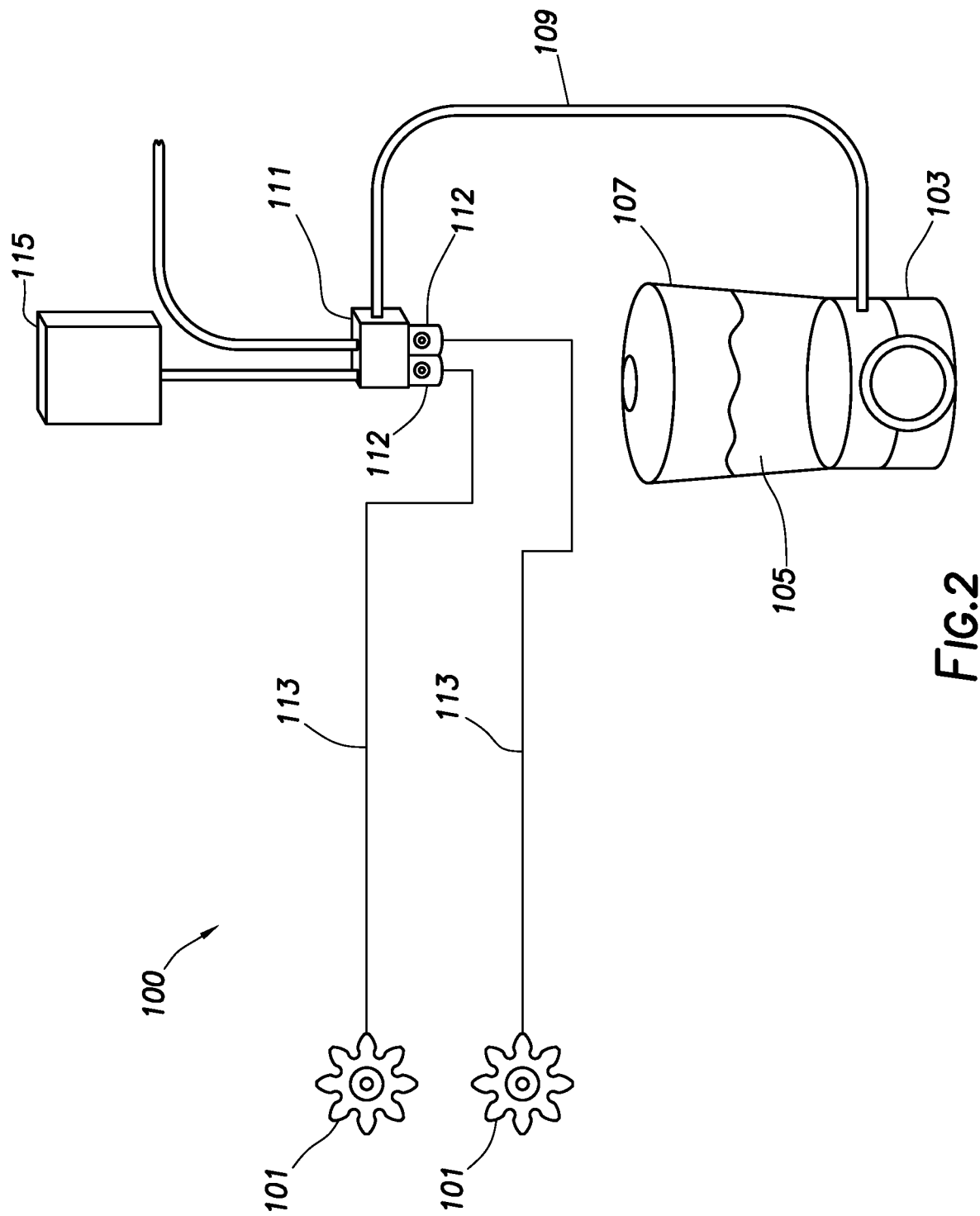
FIG. 2 depicts a schematic view of a lubrication system consistent with at least one embodiment of the present disclosure

In some embodiments, as depicted in FIG. 2, lubrication system 100 may include pump 103. Pump 103 may pump lubricant 105 from lubricant reservoir 107 through lubricant supply line 109 to manifold 111. Pump 103 may be a rotary driven hydraulic pump, reciprocating piston pump, or, as would be appreciated by one having ordinary skill in the art with the benefit of this disclosure, any pump capable of pumping the selected lubricant 105 through lubrication system 100. Lubricant 105 may in some embodiments be grease. In some embodiments, manifold 111 may couple lubricant supply line 109 to lubricating pinions 101 via pinion supply lines 113, allowing flow of lubricant 105 to lubricating pinions 101. In some embodiments, one or more valves 112 may be positioned between manifold 111 and pinion supply lines 113, allowing flow of lubricant 105 to lubricating pinions 101 to be regulated as discussed further herein below. In some embodiments, valves 112 may be controlled by controller 115. In some embodiments, valves 112 may be, for example and without limitation, ejectors. In some embodiments, controller 115 may control pump 103 to regulate flow of lubricant 105 to lubricating pinions 101. In some embodiments, controller 115 may control the flow of lubricant 105 by turning on or off pump 103. In some embodiments, controller 115 may control a pumping rate of pump 103. In some embodiments, controller 115 may open or close valves 112 to permit or restrict flow of lubricant 105.

In some embodiments, controller 115 may partially open valves 112 to control the flow rate of lubricant 105. In some embodiments, controller 115 may be controlled or adjusted remotely, such as, for example and without limitation, from a drill chair.

In some embodiments, lubrication system 100 may provide a continuous flow of lubricant 105 to lubricating pinions 101. In some embodiments, a discontinuous flow of lubricant 105 may be supplied to lubricating pinions 101. For example and without limitation, lubricant 105 may be supplied to lubricating pinions 101 at a preset interval or in response to operator input. In some embodiments, controller 115 may regulate the supply of lubricant 105 to lubricating pinions 101 based on operations of drilling rig 10. For example, in some embodiments, lubricant 105 may be supplied to lubricating pinions 101 when carriage 25 is in motion. In some embodiments, lubricant 105 may be supplied to lubricating pinions 101 when carriage 25 is moving downward, moving upward, or when carriage 25 is moving either downward or upward.

Figure 3:
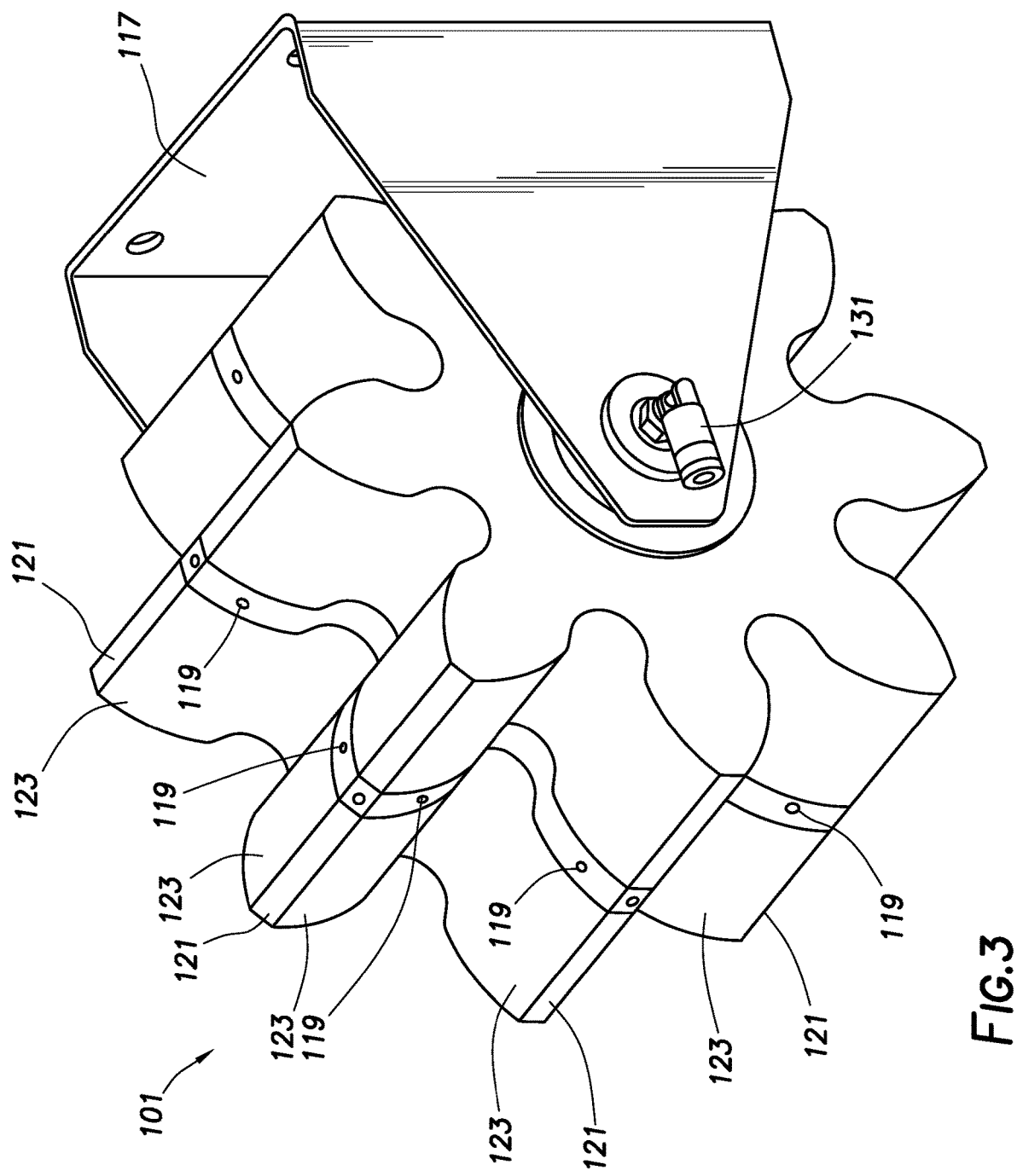
FIG. 3 depicts a perspective view of a lubricating pinion used in a lubrication system consistent with at least one embodiment of the present disclosure.

In some embodiments, as depicted in FIG. 3, each lubricating pinion 101 may be mechanically coupled to frame 117. Frame 117 may mechanically couple to carriage 25 to support lubricating pinion 101 in engagement with rack 20.

In some embodiments, each lubricating pinion 101 may include one or more lubricant dispensing ports 119. Lubricant dispensing ports 119 may be formed on teeth 121 of lubricating pinion 101. In some embodiments, one or more lubricant dispensing ports 119 may be formed on each face 123 of each tooth 121. Lubricant dispensing ports 119 may be positioned on teeth 121 along the path of contact between teeth 121 and rack 20. In some embodiments, lubricant dispensing ports 119 may be positioned along the pitch circle of lubricating pinion 101. Pitch circle, as understood in the art, signifies the imaginary circle of lubricating pinion 101 which would rotate without slip as lubricating pinion 101 moves along rack 20.

Figure 4:
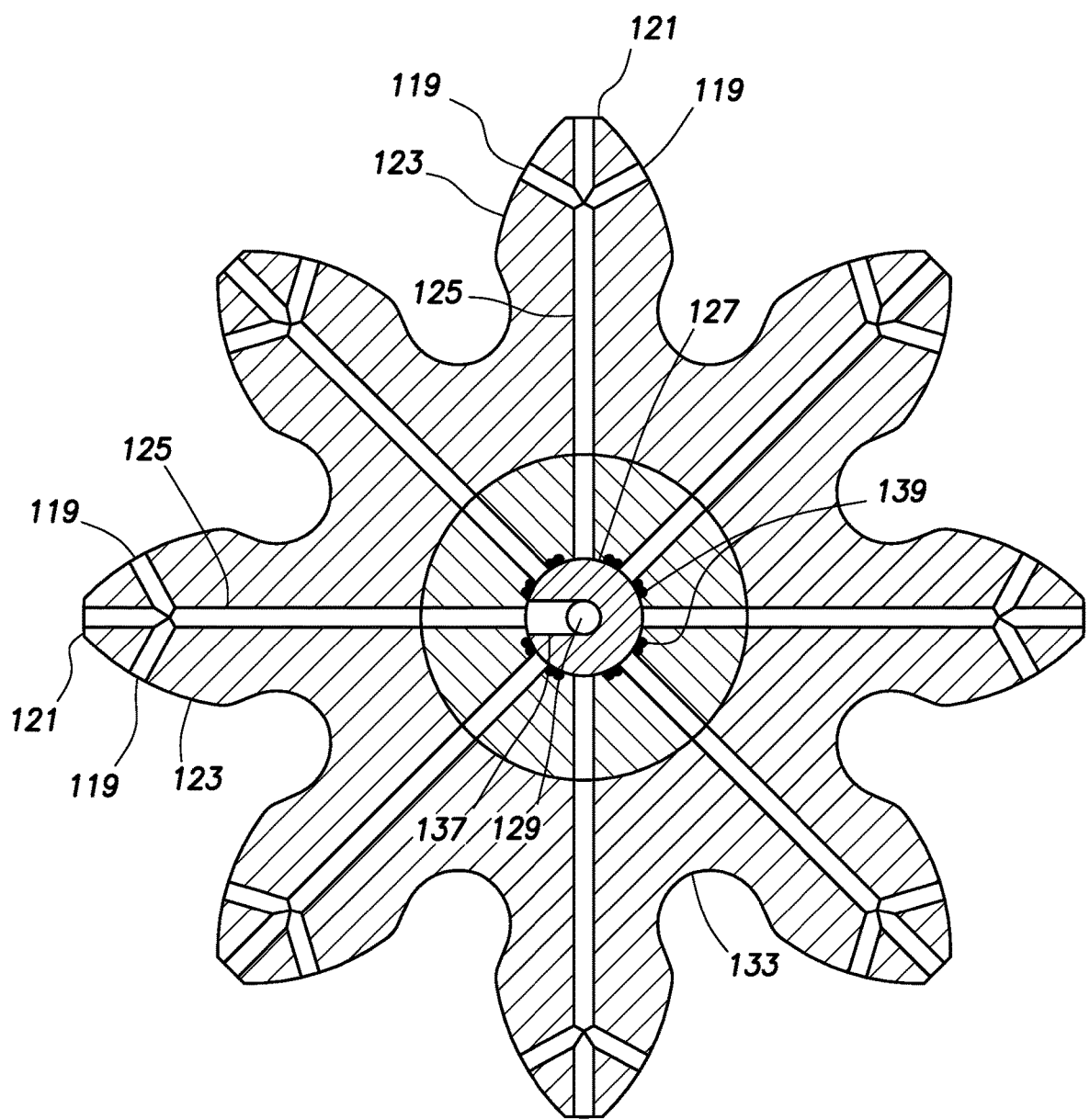
FIG. 4 depicts a cross section view of the lubricating pinion of FIG. 2.

In some embodiments, as depicted in FIG. 4, each lubricant dispensing port 119 may be fluidly coupled to a respective lubricant port 125. Each lubricant port 125 may extend radially inward toward inner hub 127 of lubricating pinion 101.

Figure 5:
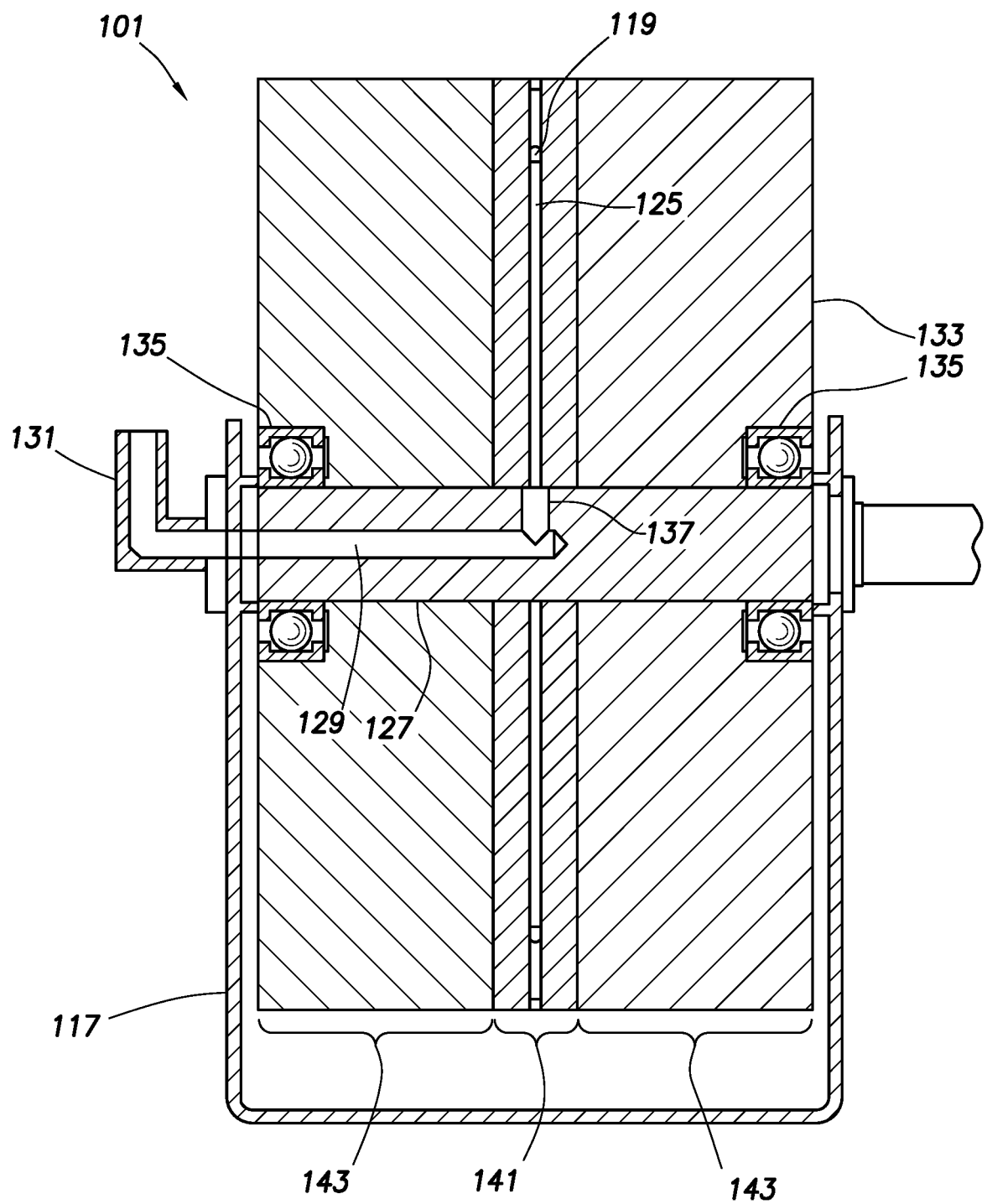
FIG. 5 depicts a cross section view of the lubricating pinion of FIG. 2.

In some embodiments, with reference to FIGS. 4, 5, inner hub 127 may include inner bore 129. Inner bore 129 may be fluidly coupled to pinion supply line 113. In some embodiments, inner bore 129 may be in fluid communication with lubricant reservoir 107 when lubricant 105 is supplied to lubricating pinion 101. In some embodiments, inner bore 129 may be fluidly coupled to lubricant fitting 131. In some embodiments, inner hub 127 of lubricating pinion 101 may remain stationary with respect to frame 117. In some such embodiments, teeth 121 may be formed on pinion outer body 133 which may rotate freely relative to inner hub 127. In some embodiments, one or more bearings 135 may be positioned between inner hub 127 and pinion outer body 133.

In some embodiments, inner hub 127 may include radial dispensing port 137. Radial dispensing port 137 may be fluidly coupled to inner bore 129 and may radially extend from inner bore 129 to an outer surface of inner hub 127. Radial dispensing port 137 may be oriented such that as pinion outer body 133 is rotated, a lubricant port 125 may come into alignment with radial dispensing port 137, allowing fluid communication between inner bore 129 and lubricant dispensing ports 119 coupled to the lubricant port 125. Radial dispensing port 137 may, in some embodiments, be oriented relative to carriage 25 such that lubricant 105 is dispensed by lubricant dispensing ports 119 when they are in a desired relative orientation to rack 20. For example and without limitation, in some embodiments, radial dispensing port 137 may be formed such that radial dispensing port 137 extends in the direction of rack 20, such that lubricant 105 is dispensed to lubricant port 125 associated with lubricant dispensing ports 119 of tooth 121 engaged with rack 20.

In some embodiments, one or more seals 139 may be positioned between inner hub 127 and pinion outer body 133 to, for example and without limitation, reduce or restrict lubricant 105 from flowing to lubricant ports 125 not aligned with radial dispensing port 137.

In some embodiments, pinion outer body 133 may be formed from one or more subcomponents. For example and without limitation, in some embodiments, as depicted in FIG. 5, pinion outer body 133 may be formed from subcomponents core 141 and one or more spreaders 143. Core 141 may, in some embodiments, be formed from a rigid material and may house lubricant dispensing ports 119 and lubricant ports 125 as described herein above. In some embodiments, core 141 may be formed from a rigid material such as aluminum or steel. In some embodiments, spreaders 143 may be formed from a conformable material such as rubber or foam. Spreaders 143 may, in some embodiments, spread lubricant 105 dispensed from lubricant dispensing ports 119 of core 141 across face 123 of tooth 121. Although depicted as including a single core 141 and two spreaders 143, one having ordinary skill in the art with the benefit of this disclosure will understand that any number of cores 141 and spreaders 143 may be utilized in lubricating pinion 101.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
   providing a mast, the mast being vertical, the mast having a rack;
   mechanically coupling a carriage to the mast such that the carriage is movable relative to the mast, the carriage including a lubrication system, the lubrication system including:
   a lubricating pinion, the lubricating pinion mechanically coupled to the carriage and in engagement with the rack, the engagement between the pinion and rack defining a pitch circle of the lubricating pinion, the lubricating pinion including a lubricant dispensing port, the lubricant dispensing port formed on a face of a tooth of the lubricating pinion, the lubricant dispensing port positioned at a distal end of the tooth or positioned along the pitch circle, the lubricating piston including:
   a core, the core formed from a rigid material, the lubricant dispensing port formed in the core; and
   a spreader, the spreader formed from a conformable material;

a lubricant reservoir; and
a pump to pump lubricant from the lubricant reservoir to the lubricant dispensing port;
pumping lubricant from the lubricant reservoir to the lubricating pinion;
dispensing lubricant from the lubricant dispensing port;
moving the carriage relative to the mast;
rotating the pinion; and
spreading the lubricant with the spreader as the lubricating pinion is rotated.

2. The method of claim 1, wherein the lubricating pinion further comprises:
an inner hub, the inner hub including an inner bore in fluid communication with the lubricant reservoir and a radial dispensing port extending from the inner bore to an outer surface of the inner hub; and
a pinion outer body, the pinion outer body including the tooth, the lubricant dispensing port, and a lubricant port fluidly coupled to the lubricant dispensing port;
wherein the method further comprises:
rotating the pinion until the lubricant port is aligned with the radial dispensing port; and
supplying lubricant to the lubricant dispensing port.

3. The method of claim 2, wherein the radial dispensing port is formed in the direction of the rack.

4. The method of claim 2, wherein the lubricating pinion further comprises a second lubricant dispensing port positioned on a second tooth of the pinion outer body, the second lubricant dispensing port fluidly coupled to a second lubricant port, and the method further comprises:
rotating the lubricating pinion until the second lubricant port is not aligned with the radial dispensing port.

5. The method of claim 1, wherein lubricant is dispensed when the carriage is moving one or both of downward and upward.

6. The method of claim 1, wherein the lubrication system further comprises a controller, and the method further comprises controlling or adjusting the amount of lubricant dispensed with the controller.

7. The method of claim 6, further comprising controlling or adjusting the amount of lubricant dispensed from a remote location.

8. The method of claim 1, wherein the spreader is formed from rubber or foam.

* * * * *